United States Patent
Xu

(10) Patent No.: US 8,229,011 B2
(45) Date of Patent: Jul. 24, 2012

(54) FINE SYMBOL TIMING SYNCHRONIZATION METHOD AND APPARATUS IN OFDM SYSTEM

(75) Inventor: Yu-Ting Xu, Taipei (TW)

(73) Assignee: ALi Corporation, Taipei (TW)

(*) Notice: Subject to any disclaimer, the term of this patent is extended or adjusted under 35 U.S.C. 154(b) by 760 days.

(21) Appl. No.: 12/323,948

(22) Filed: Nov. 26, 2008

(65) Prior Publication Data

US 2010/0074348 A1  Mar. 25, 2010

(30) Foreign Application Priority Data

Sep. 25, 2008 (CN) .......................... 2008 1 0200484

(51) Int. Cl.
*H04K 1/10* (2006.01)
(52) U.S. Cl. .................................... 375/260; 375/354
(58) Field of Classification Search .................. 375/260, 375/316, 354; 370/208–210
See application file for complete search history.

(56) References Cited

U.S. PATENT DOCUMENTS

| | | | |
|---|---|---|---|
| 7,139,320 B1 | 11/2006 | Singh et al. | |
| 7,251,345 B1* | 7/2007 | Han | 382/103 |
| 2005/0105659 A1 | 5/2005 | Sheu et al. | |
| 2006/0171493 A1 | 8/2006 | Kim et al. | |
| 2007/0076804 A1* | 4/2007 | Sestok et al. | 375/260 |
| 2008/0075189 A1* | 3/2008 | Li et al. | 375/267 |
| 2008/0084817 A1* | 4/2008 | Beckman et al. | 370/210 |

* cited by examiner

*Primary Examiner* — Emmanuel Bayard
(74) *Attorney, Agent, or Firm* — J.C. Patents

(57) ABSTRACT

A fine symbol timing synchronization method and apparatus in an orthogonal frequency-division multiplexing (OFDM) system are provided. The fine symbol timing synchronization method finds a path with a minimum mean square error (MMSE) as a first path among a plurality of paths, and a formula of the mean square error (MSE) used by the method is a simplified formula of the original MSE formula with low calculation complexity. Therefore, the time required by the fine symbol timing synchronization method is short, and a correct first path can be found, so as to lock a starting position of a fast Fourier transform (FFT) window on a starting position of a symbol signal of the correct first path.

20 Claims, 10 Drawing Sheets

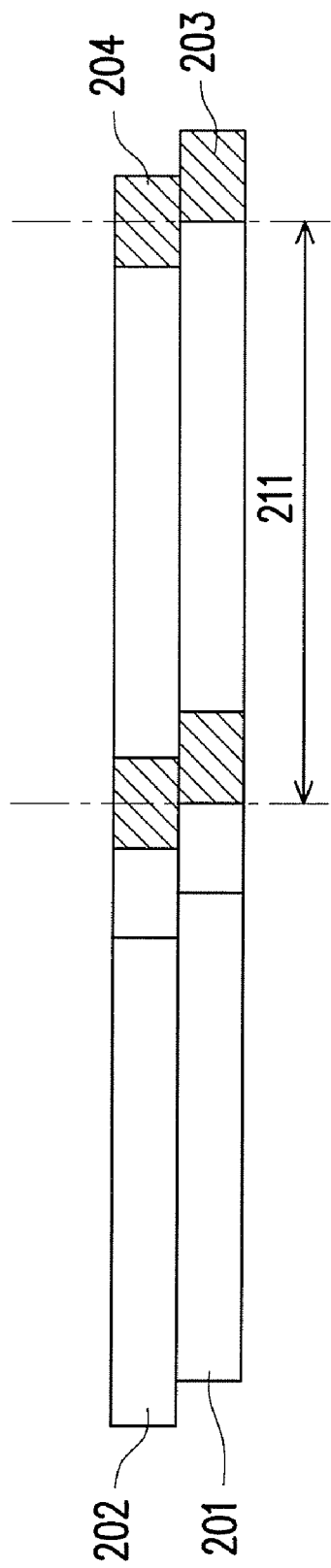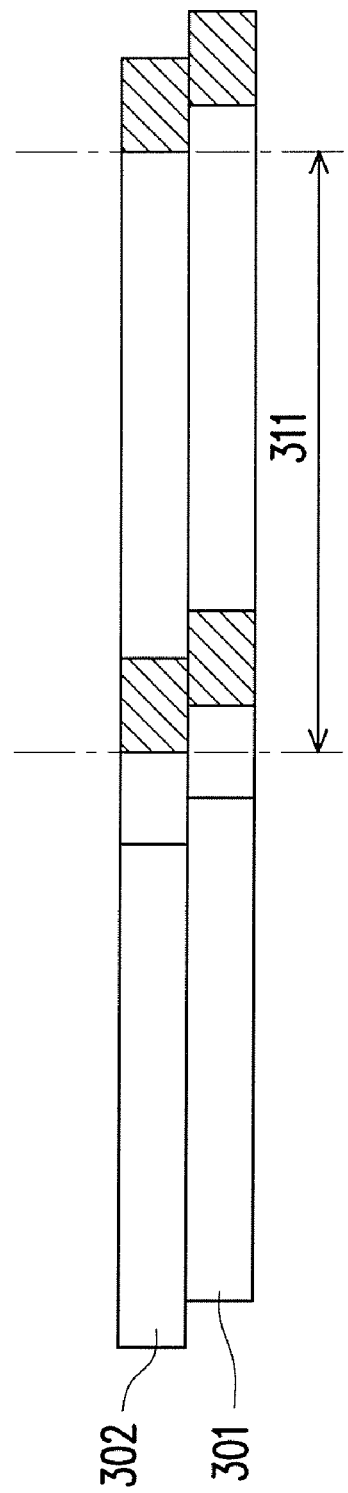

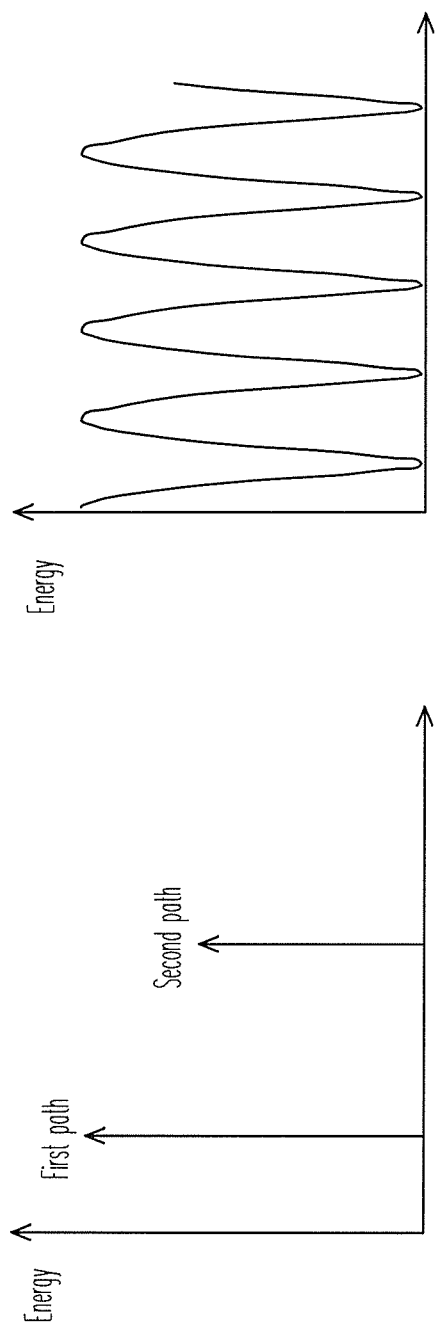
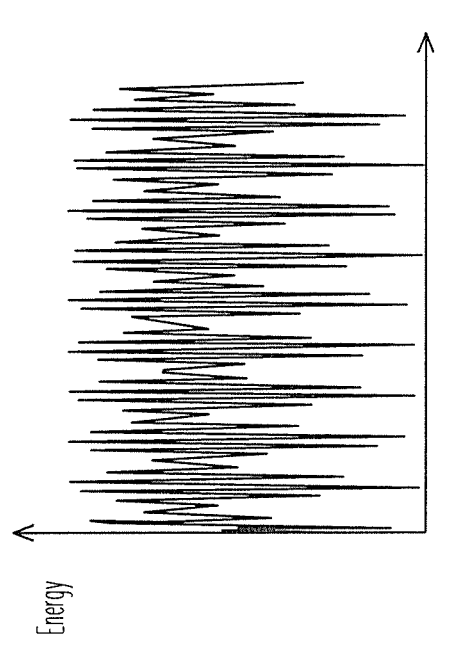
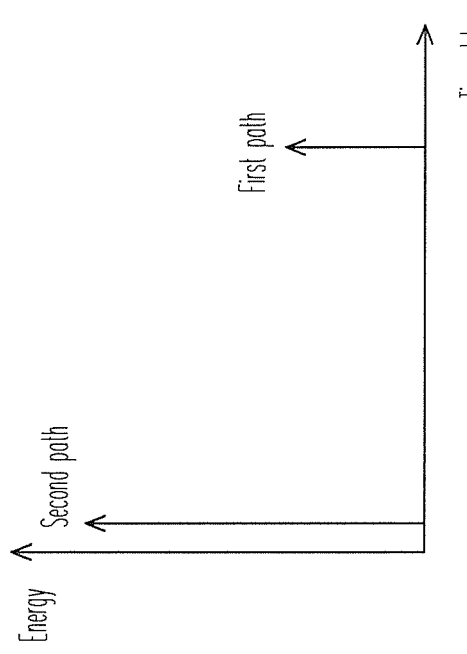

FINE SYMBOL TIMING SYNCHRONIZATION METHOD AND APPARATUS IN OFDM SYSTEM

CROSS-REFERENCE TO RELATED APPLICATION

This application claims the priority benefit of China application serial no. 200810200484.9, filed on Sep. 25, 2008. The entirety of the above-mentioned patent application is hereby incorporated by reference herein and made a part of specification.

BACKGROUND OF THE INVENTION

1. Field of the Invention

The present invention generally relates to a symbol timing synchronization method and apparatus, in particular, to a fine symbol timing synchronization method and apparatus in an orthogonal frequency-division multiplexing (OFDM) system.

2. Description of Related Art

In an orthogonal frequency-division multiplexing (OFDM) system, a multi-carrier modulation technique is applied, and a channel is divided into a plurality of orthogonal sub-channels. Therefore, through the OFDM system, a high-speed data flow may be converted into parallel low-speed sub-data flows, and these parallel low-speed sub-data flows are modulated so as to be transmitted over each sub-channel. The above orthogonal signals may be separated by a relevant modulation technique at a receiving end, such that an inter-channel-interference (ICI) may be effectively reduced. In addition, since a signal bandwidth on each sub-channel is smaller than the bandwidth of the whole transmission channel, an inter-symbol-interference (ISI) can be reduced or eliminated.

The OFDM system is capable of effectively resisting the multi-path time-delay spread and has a high spectrum utility factor, but also has a disadvantage of being sensitive to synchronization errors. The synchronization error mainly includes carrier frequency offset, sampling clock offset, and symbol timing synchronization offset. The symbol timing synchronization offset may result in the ISI and ICI, and seriously affect the demodulation system.

The OFDM technique is widely applied in digital broadcasting systems, for example, in a digital video broadcasting-terrestrial (DVB-T) system. Referring to FIG. 1, a systematic block diagram of a DVB-T system 100 is shown. The DVB-T system 100 includes a transmitter 101 and a receiver 102. After receiving a symbol signal, the transmitter 101 processes the symbol signal, and transmits the processed symbol signal to the receiver 102 through a wireless channel 17. Then, the receiver 102 receives the symbol signal from the wireless channel 17 and processes the received symbol signal, so as to decode the symbol signal transmitted by the transmitter 101.

The transmitter 101 includes a pilot and transmission parameter signaling (TPS) inserter 11, a guard interval (GI) inserter 12, an inversed fast Fourier transformer 13, a cyclic prefix (CP) inserter 14, a digital-to-analog converter 15, and a transmitter front-end circuit 16. The receiver 102 includes a receiver front-end circuit 18, an analog-to-digital converter 19, a down-conversion and anti-aliasing filter circuit 20, an interpolator 21, a frequency and phase offset corrector 22, a coarse symbol timing synchronization apparatus 23, a CP remover 24, a fast Fourier transformer 25, a TPS acquisition circuit 26, a channel estimation and equalization circuit 27, a fine symbol timing synchronization apparatus 28, a carrier synchronization apparatus 29, and a sampling synchronization apparatus 30.

First, the transmitter 101 receives a frequency domain symbol signal. The pilot and TPS inserter 11 inserts a plurality of scattered pilots and TPSs into the received frequency domain symbol signal. The GI inserter 12 inserts a GI into its received input signal (performing a zero padding on two ends of a frequency band of this received input signal). Afterward, the inversed fast Fourier transformer 13 performs an inversed fast Fourier transform (IFFT) on its received input signal (frequency domain signal), so as to generate an output signal (time domain signal).

Next, the CP inserter 14 inserts a CP into its received input signal. Then, the digital-to-analog converter 15 converts its received input signal (digital signal) into an analog output signal. The transmitter front-end circuit 16 processes its received input signal (base band analog signal) to generate an output signal (radio-frequency analog signal), and transmits the output signal to the receiver 102 through the wireless channel 17.

The receiver front-end circuit 18 receives the output signal transmitted by the transmitter 10 through the wireless channel 17, and then processes its received input signal. Next, the analog-to-digital converter 19 converts its received input signal (analog signal) into a digital signal. After that, the down-conversion and anti-aliasing filter circuit 20 performs down-conversion, anti-aliasing, and filtering operations on its received input signal (digital signal).

The interpolator 21 receives a synchronous sampling signal generated by the sampling synchronization apparatus 30, and performs an interpolation operation on the output signal of the down-conversion and anti-aliasing filter circuit 20 according to the synchronous sampling signal. The frequency and phase offset corrector 22 performs a frequency and phase offset correction on the output signal of the interpolator 22 according to a synchronous carrier signal generated by the carrier synchronization apparatus 29.

Then, the coarse symbol timing synchronization apparatus 23 performs a coarse symbol timing synchronization on the output signal of the frequency and phase offset corrector 22, and accordingly adjusts a time delay offset of the output signal of the frequency and phase offset corrector 22, such that the output signal of the frequency and phase offset corrector 22 roughly falls in a correct fast Fourier transform (FFT) window. The CP remover 24 adjusts a time delay of the output signal of the coarse symbol timing synchronization apparatus 23 according to the output signal of the fine symbol timing synchronization apparatus, and accurately removes the CP of the output signal of the coarse symbol timing synchronization apparatus 23. Afterward, the fast Fourier transformer 25 performs an FFT on the output signal (time domain signal) of the CP remover 24, so as to generate a frequency domain output signal.

The fine symbol timing synchronization apparatus 28 performs a fine symbol timing synchronization on the output signal of the fast Fourier transformer 25, so as to obtain an accurate time delay of its received input signal, such that the fine symbol timing synchronization apparatus 28 enables the CP remover 24 to find a correct starting position of the FFT window when removing the CP. The carrier synchronization apparatus 29 performs a carrier synchronization on the output signal of the fast Fourier transformer 25 to obtain a correct synchronous carrier signal. The sampling synchronization apparatus 30 performs a sampling synchronization on the output signal of the fast Fourier transformer 25 to obtain the correct synchronous sampling signal.

Then, the TPS acquisition circuit 26 acquires the TPS in the output signal of the fast Fourier transformer 25. Finally, the channel estimation and equalization circuit 27 performs channel estimation and equalization operations on its received input signal, and outputs an equalized signal to the back-end circuit connected to the receiver 102.

In order to effectively eliminate the complicated multi-path effect, the CP is inserted in the OFDM system to reduce the interference of the multi-path effect. That is, the OFDM system replicates the data behind the symbol signal to the front-end of the symbol signal to serve as the GI, so as to reduce the interference on the output signal of the transmitter coming from a plurality of paths of the wireless channel.

The symbol timing synchronization is generally divided into two stages, namely, fine symbol timing synchronization and coarse symbol timing synchronization. The fine symbol timing synchronization is performed after the FFT, for detecting a residual symbol synchronization offset, so as to accurately lock the starting position of the FFT window on the starting position of the symbol signal of a first path. The coarse symbol timing synchronization is performed before the FFT, and the starting position of the symbol signal is determined through the autocorrelation of the CP. When the signal to noise ratio (SNR) is low, the accuracy of the coarse symbol timing synchronization is also low.

FIGS. 2A and 2B respectively show starting positions of FFT windows 211 and 311 in a multi-path channel. In FIGS. 2A and 2B, the starting positions of the FFT windows 211 and 311 are not synchronous, and the symbol timing synchronization technique is employed to estimate the correct starting position of each FFT window. In the multi-path channel, the correct starting position of the FFT window is equal to the starting position of the symbol signal of the first path. Therefore, since the starting position of the FFT window is accurately locked on the starting position of the symbol signal of the first path, the CP remover is enabled to accurately remove the CP. Referring to FIG. 2A, in the multi-path channel, a symbol signal 201 of the first path and a symbol signal 202 of a second path are provided, and the dashed areas are CPs 203 and 204 of the symbol signals. Generally, in the conventional symbol timing synchronization method, the starting position of the symbol signal 201 of the first path, instead of the starting position of the symbol signal 202 of the second path, is set as the correct starting position of the FFT window 211.

Referring to FIG. 2B, the energy of a symbol signal 301 of the first path is smaller than that of a symbol signal 302 of the second path. Due to multi-path attenuation, in the conventional symbol timing synchronization method, the starting position of the FFT window is locked on the starting position of the maximum path. Therefore, in this example, the starting position of the FFT window 311 is locked on the starting position of the symbol signal 302 of the second path instead of the starting position of the symbol signal 301 of the first path. When the starting position of the FFT window 311 is locked on the false position, a severe failure may occur to the back-end circuit during the subsequent channel estimation and equalization operations, thus affecting the receiving performance of the receiver.

FIG. 3 is a systematic block diagram of the fine symbol timing synchronization apparatus 28 in the DVB-T system 100. The fine symbol timing synchronization apparatus 28 adopts the conventional fine symbol timing synchronization method to find the correct FFT window according to a channel impulse response estimated by the receiver 102. The fine symbol timing synchronization apparatus 28 includes a scattered pilot extraction circuit 284, an inversed fast Fourier transformer 286, and an FFT window estimation circuit 288.

Referring to FIGS. 1 and 3 together, the CP remover 24 removes the CP of the output signal of the coarse symbol timing synchronization apparatus 23 according to the starting position of the FFT window found by the fine symbol timing synchronization apparatus 28. The scattered pilot extraction circuit 284 receives the output signal of the fast Fourier transformer 25, and extracts a plurality of scattered pilots from its received input signal. Next, the scattered pilot extraction circuit 284 calculates a channel frequency response according to the scattered pilots, and outputs the channel frequency response to the inversed fast Fourier transformer 286. The inversed fast Fourier transformer 286 performs an IFFT on the channel frequency response to obtain the channel impulse response. After that, the FFT window estimation circuit 288 finds the position with the energy exceeding the threshold first or the position with the maximum energy as the starting position of the symbol signal in the channel impulse response from the inversed fast Fourier transformer 286, and locks the starting position of the FFT window on the position found by the FFT window estimation circuit 28. If the FFT window is accurately locked on the position of the first path, the receiver may reduce the interference resulted from the synchronization error in the multi-path channel, such as ICI and ISI.

To be brief, in the conventional fine symbol timing synchronization method, the fine symbol timing synchronization is performed based on the first path in the channel impulse response, and the first path may be the path with the energy exceeding the threshold first or the maximum path with the maximum energy. Besides, in the conventional symbol timing synchronization method, the path with the minimum noise power in the channel impulse response is found as the first path, and such a method for founding the first path is called a noise power method.

The synchronization time of the fine symbol timing synchronization method, in which finding the path with the energy exceeding the threshold first or the maximum path with the maximum energy in the channel impulse response as the first path, is relatively short. However, when the energy of the symbol signal of the first path is smaller than that of the symbol signal of the second path, the conventional fine symbol timing synchronization method may mistake the second path as the first path, thus affecting the performance of the whole receiver.

Though the fine symbol timing synchronization method by taking the path with the minimum noise power in the channel impulse response as the first path may solve the problem that the energy of the symbol signal of the first path is smaller than that of the symbol signal of the second path, the complexity of a feedback circuit needed for calculating the noise power is quite high, so the required synchronization time is relatively long. Generally, in an 8K mode of the DVB-T system, the synchronization time is approximately tens of milliseconds. Further, in the multi-path channel, the energies of the symbol signals of certain paths are much smaller than that of the symbol signal of the maximum path (usually with a difference of more than 18 dB), and their SNR values are quite low, such that the conventional fine symbol timing synchronization method becomes inaccurate, and false determination may occur.

To sum up, under the circumstance that the SNR is relatively low, if the symbol signal is transmitted in the wireless channel with multi-path attenuation, it is difficult for the receiver employing the conventional fine symbol timing synchronization method to stably detect the correct synchronization position of the symbol signal.

SUMMARY OF THE INVENTION

Accordingly, the present invention is directed to a fine symbol timing synchronization method and apparatus in an orthogonal frequency-division multiplexing (OFDM) system, for locking a starting position of a fast Fourier transform (FFT) window on a starting position of a symbol signal of a first path.

In an embodiment of the present invention, a fine symbol timing synchronization method in an OFDM system is provided. The system includes the steps of: (1) receiving a plurality of first time domain symbol signals; (2) performing an FFT on the first time domain symbol signals to generate a plurality of first frequency domain symbol signals; (3) extracting a plurality of scattered pilots from the first frequency domain symbol signals, and calculating a plurality of first channel frequency responses according to the scattered pilots; (4) performing an interpolation on the first channel frequency responses to generate a second channel frequency response; (5) storing one of the first frequency domain symbol signals, in which the stored first frequency domain symbol signal is corresponding to the second channel frequency response; (6) performing a zero padding operation on the second channel frequency response, and performing an inversed fast Fourier transform (IFFT) on a zero padding result to obtain a first channel impulse response; (7) setting a threshold, and finding a plurality of paths in the first channel impulse response according to the first channel impulse response and the threshold; and (8) calculating a mean square error (MSE) when each path in the first channel impulse response serves as the first path, and setting the path with a minimum mean square error (MMSE) as the first path.

According to an embodiment of the present invention, the step of calculating the MSE when each path in the first channel impulse response serves as the first path, and setting the path with the MMSE as the first path further includes: (a) calculating a distance between an i-th path of the first channel impulse response and an initial point, the i-th path of the first channel impulse response being in reference to the left, wherein when i=1, the distance between the i-th path of the first channel impulse response and the initial point is a leftward displacement of the i-th path of the first channel impulse response to the initial point, and when i≠1, the distance between the i-th path of the first channel impulse response and the initial point is a rightward displacement of the i-th path of the first channel impulse response to the initial point; (b) calculating a third channel frequency response according to the distance between the i-th path of the first channel impulse response and an initial point, and the second channel frequency response; (c) selecting a sub-carrier satisfying a specific condition from the stored first frequency domain symbol signal to calculate the MSE with the third channel frequency response; (d) checking whether the calculation of MSE is done when each path serves as the first path; and (e) comparing the MSE of each path, and setting the path with the MMSE as the first path.

In an embodiment of the present invention, a fine symbol timing synchronization apparatus in an OFDM system is provided. The apparatus includes a channel frequency response calculation circuit, a storage circuit, an inversed fast Fourier transformer, a channel impulse response calculation circuit, and an MSE calculation and comparison circuit. An input end of the channel frequency response calculation circuit is coupled to an input end of the fine symbol timing synchronization apparatus. An input end of the storage circuit is coupled to an output end of the channel frequency response calculation circuit. An input end of the inversed fast Fourier transformer is coupled to an output end of the storage circuit. An input end of the channel impulse response calculation circuit is coupled to an output end of the inversed fast Fourier transformer. An input end of the MSE calculation and comparison circuit is coupled to an output end of the channel impulse response calculation circuit. The channel frequency response calculation circuit receives a plurality of first frequency domain symbol signals, extracts a plurality of scattered pilots from the first frequency domain symbol signals, calculates a plurality of first channel frequency responses according to the scattered pilots, and performs an interpolation on the first channel frequency responses to generate a second channel frequency response. The storage circuit stores one of the first frequency domain symbol signals, and the stored first frequency domain symbol signal is corresponding to the second channel frequency response. The inversed fast Fourier transformer performs a zero padding operation on the second channel frequency response, and performs an IFFT after the zero padding operation to obtain a first channel impulse response. The channel impulse response calculation circuit has a threshold, and finds a plurality of paths in the first channel impulse response according to the first channel impulse response and the threshold. The MSE calculation and comparison circuit calculates an MSE of each path when each path in the first channel impulse response serves as a first path, and sets the path with an MMSE as the first path.

According to the embodiment of the present invention, the fine symbol timing synchronization method finds the path with the MMSE as the first path among a plurality of paths, and the formula of the MSE used by the method is reduced to a formula of the MSE with low calculation complexity. Therefore, the time required by the fine symbol timing synchronization method, apparatus, and communication transceiver thereof is short, and a correct first path can be found, so as to lock the starting position of the FFT window on the starting position of the symbol signal of the correct first path.

In order to have a further understanding of above features and efficacies of the present invention, a detailed description is given below with embodiments and accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A is a schematic view of the starting position of an FFT window 211 in a multi-path channel.

FIG. 2B is another schematic view of the starting position of an FFT window 311 in a multi-path channel.

FIG. 5A is a schematic view of a channel impulse response when the energy of the symbol signal of a first path is greater than that of the symbol signal of a second path.

FIG. 5B is a schematic view of a frequency response of the channel impulse response in FIG. 5A.

FIG. 5C is a schematic view of the channel impulse response when the energy of the symbol signal of the second path is greater than that of the symbol signal of the first path.

FIG. 5D is a schematic view of the frequency response of the channel impulse response in FIG. 5C.

DESCRIPTION OF THE EMBODIMENTS

Figure 1:
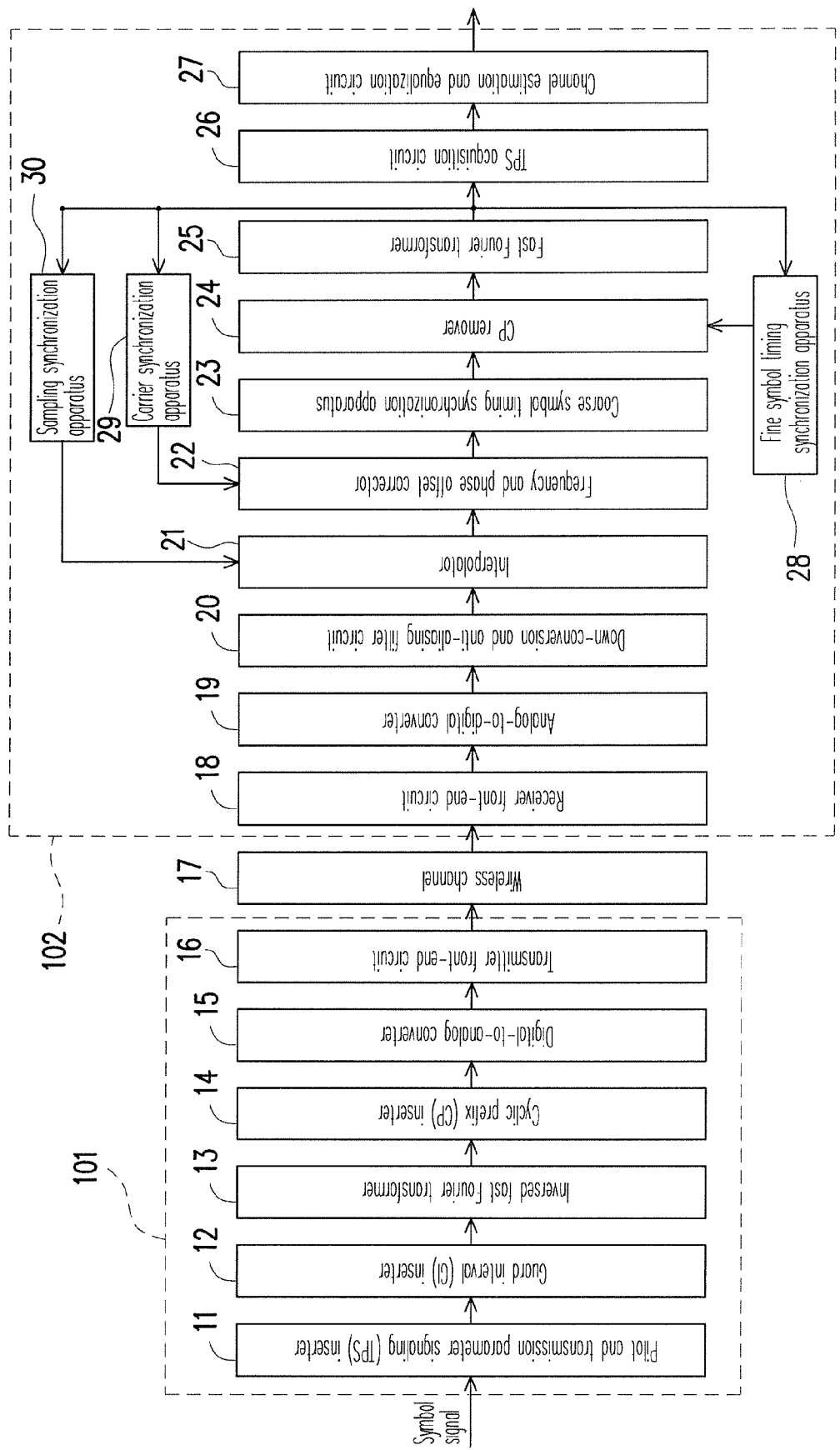
FIG. 1 is a systematic block diagram of a DVB-T system 100.
Figure 3:
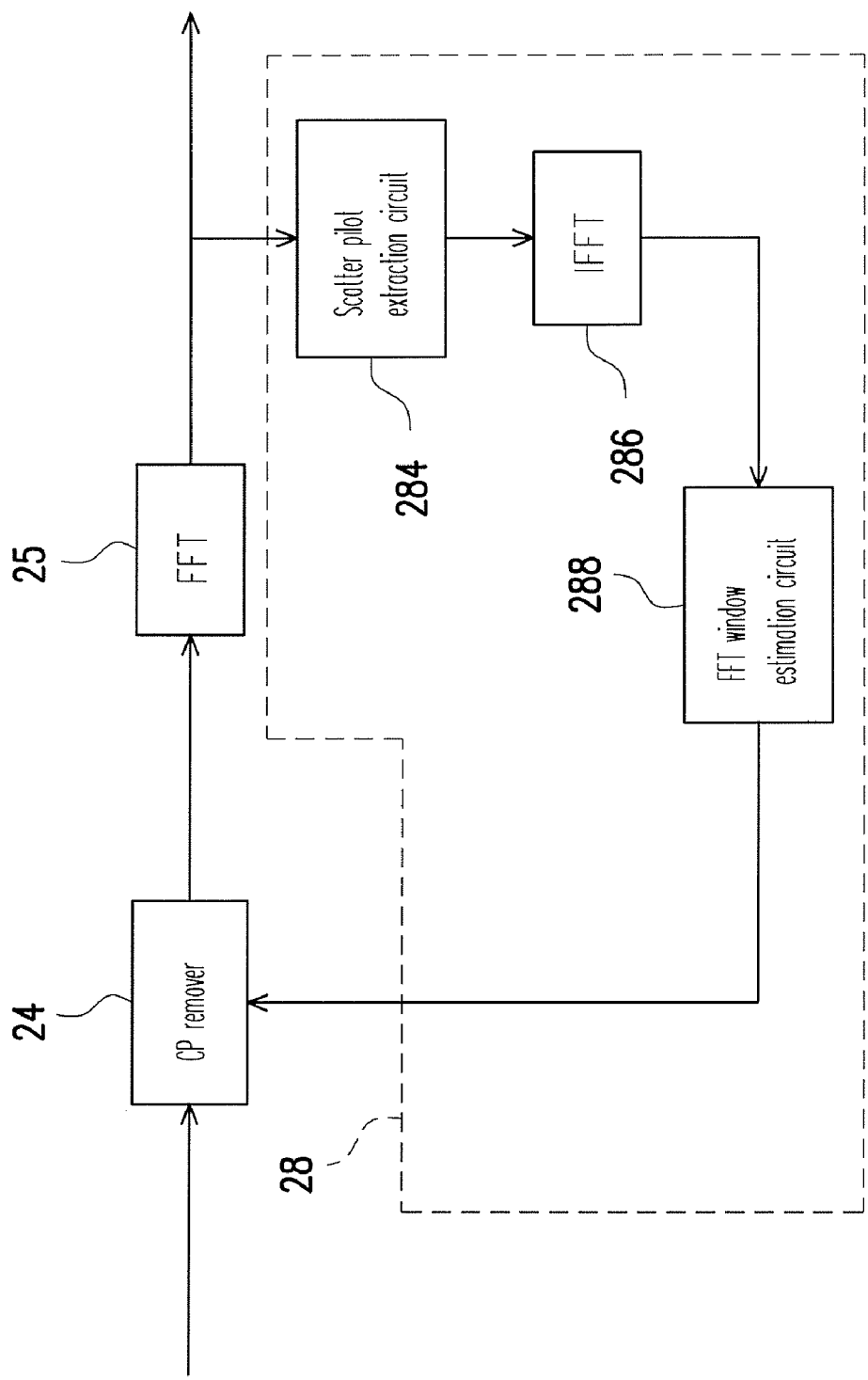
FIG. 3 is a systematic block diagram of a fine symbol timing synchronization apparatus 28 in the DVB-T system 100.

Reference will now be made in detail to the present embodiments of the invention, examples of which are illustrated in the accompanying drawings. Wherever possible, the same reference numbers are used in the drawings and the description to refer to the same or like parts.

In order to solve the problem of the conventional fine symbol timing synchronization method that the first path is falsely determined, a fine symbol timing synchronization method and apparatus in an OFDM system are provided in the following embodiments of the present invention.

Figure 4A:
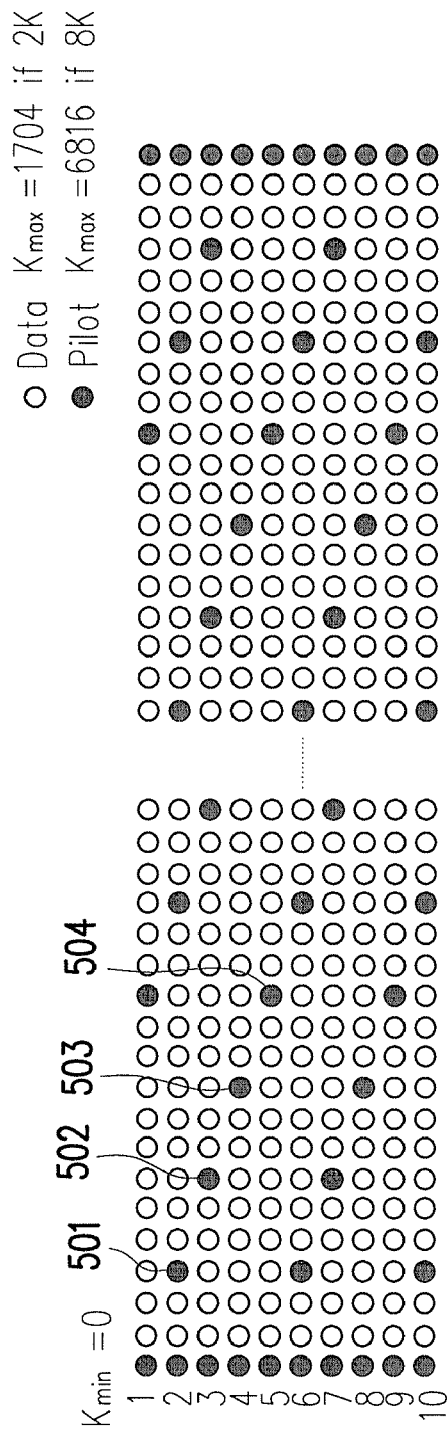
FIG. 4A is a schematic view illustrating the structures of symbol signals in the DVB-T system.

Before the description of the fine symbol timing synchronization method according to an embodiment of the present invention, the structure or relevant principle of the symbol signal in a DVB-T system is given. FIG. 4A is a schematic view illustrating the structures of symbol signals in the DVB-T system. In the standard of the DVB-T system, the insertion positions of the scattered pilots follow a certain rule. Besides being inserted into the head and the tail sub-carriers (two sub-carriers at $K_{min}$ and $K_{max}$, in which $K_{max}$ is respectively 1704 and 6816 in 8K and 2K modes), a scattered pilot is inserted every 12 sub-carriers. In addition, between every two adjacent symbol signals, the starting position of the inserted scattered pilot is spaced from each other by two sub-carriers in sequence. In other words, the positions of the scattered pilots are repeated at every four symbols. For example, in the second to the fifth symbol signals, the starting positions 501-504 of the scattered pilots are spaced from one another by two sub-carriers in sequence, and the starting position of the scattered pilot of the first symbol signal is equal to the starting position of the scattered pilot of the fifth symbol signal.

The information of the scattered pilots is defined by the standard of the DVB-T system, and for the receiver, these scattered pilots are already known. The insertion positions of the scattered pilots are regular, so the receiver may acquire a channel frequency response $\hat{H}_l$ according to the scattered pilots. The channel frequency response $\hat{H}_l$ is composed of a plurality of sub-channel frequency responses $\hat{H}_{l,k}$, and the sub-channel frequency response $\hat{H}_{l,k}$ represents the sub-channel frequency response estimated from a k-th sub-carrier in an l-th symbol signal. The formula of acquiring the sub-channel frequency response $\hat{H}_{l,k}$ is as follows:

$$\hat{H}_{l,k} = Y_{l,k} \cdot \frac{P^*_{l,k}}{|P_{l,k}|^2},$$

-continued
$$\{k = K_{min} + 3 \times (l_{mod4} - 1) + 12p \mid p = 0, 1, 2, \ldots, N_p - 1, k \in [K_{min}, K_{max}]\}$$

where, $Y_{l,k}$ represents scattered pilot data on the k-th sub-channel in the received l-th symbol signal after the FFT is performed thereon, $P_{l,k}$ represents known scattered pilot data on the k-th sub-channel in the l-th symbol signal, $P^*_{l,k}$ represents known conjugated scattered pilot data on the k-th sub-channel in the l-th symbol signal, $N_p$ represents the number of the scattered pilots in each symbol signal, $l_{mod\,4}$ represents a residue of dividing l by 4, p is an integer from 0 to $N_p-1$, and $K_{min} \leq k \leq K_{max}$.

Generally, the number of data capable of being processed by the FFT and IFFT at a time is a power of 2. Therefore, a zero padding operation is performed on the channel frequency response $\hat{H}_l$, such that the zero-padded channel frequency response obtains a data of N/2 points, and a common FFT or IFFT can be performed thereon. N represents the number of data in a symbol signal with the CP removed, and N is a numerical value of the power of 2.

After the IFFT is performed on the zero-padded channel frequency response, a channel impulse response $\hat{h}_l$ is obtained. The channel impulse response $\hat{h}_l$ includes response values corresponding to multi-point time delays, and the response value $\hat{h}_{l,n}$ may be represented as follows:

$$\hat{h}_{l,n} = \text{IFFT}(\hat{H}_{l,k}), n = 0, 1, 2, \ldots, (N/2)-1.$$

The time delay n represents a quantized delay time, and the value thereof is an integer in the range of 0 to (N/2)−1. A real time of the time delay n is equal to a time obtained by dividing the period of a symbol signal by $K_{max}$ and then multiplying the result by n. On the time domain, the channel impulse response $\hat{h}_l$ reflects the multi-path information of the channel, including, for example, the number of the paths, the position and energy of each path, and the maximum delay time of the channel.

After the channel impulse response $\hat{h}_l$ is obtained, the position of each path is determined by comparing the response value $\hat{h}_{l,n}$ of the channel impulse response $\hat{h}_l$ and a threshold TH. The threshold TH is calculated by the following formula:

$$TH = r \cdot \text{avg\_CIR}; \text{avg\_CIR} = \frac{2}{N} \sum_{n=0}^{(N/2)-1} |\hat{h}_{l,n}|,$$

where avg_CIR is an absolute average value of the response value $\hat{h}_{l,n}$ of the channel impulse response $\hat{h}_l$, and r is a scale factor. The scale factor r may be set according to actual requirements or set according to statistical characteristics of the channel impulse response $\hat{h}_l$. For example, in the DVB-T system, the scale factor r is set as 5. The threshold TH is proportional to the absolute average value avg_CIR of the response value $\hat{h}_{l,n}$ of the channel impulse response $\hat{h}_l$, such that the point with the response value $\hat{h}_{l,n}$ exceeding the threshold TH is considered as a path, and the point with the response value $\hat{h}_{l,n}$ not exceeding the threshold TH is considered as just a noise. The correct starting position of the FFT window and the information of the maximum time delay can be obtained by finding the first path among the plurality of paths.

In the multi-path channel, the coarse symbol timing synchronization apparatus locks the starting position of the symbol signal on the position of the maximum path with the maximum energy. However, when the energy of the symbol signal of the first path is smaller than that of the symbol signal of the second path (referring to the circumstance in FIG. 5C), the starting position of the FFT window is locked near the starting position of the symbol signal of the second path. Here, if the path exceeding the threshold first is directly taken as the first path according to the obtained result of the channel impulse response, a false determination may occur.

In the following embodiment, how to find the correct first path through the fine symbol timing synchronization method of the present invention is described. However, before the description of the fine symbol timing synchronization method of the present invention, some interpolation methods are given below.

As described above, the scattered pilot in a symbol signal is inserted every 12 sub-carriers, such that the channel frequency response obtained by calculating the scattered pilots is actually equivalent to a ¹⁄₁₂ sampling of a real channel frequency response. The channel impulse response on the time domain is equivalent to a ¹⁄₁₂ sampling of a real channel impulse response. If the maximum time delay exceeds $T_u/12$ ($T_u$ is a period of the symbol signal), the aliasing may occur. Therefore, this allowable range of the maximum time delay cannot satisfy the application in a single frequency network (SFN). In order to improve the allowable range of the maximum time delay, an interpolation operation must be performed on the frequency response of the plurality of neighboring symbol signals on the timing axis, so as to reduce the interval between the frequency responses.

The interpolation methods may be approximately divided into three types. The first type is called direct interpolation, in which the frequency responses calculated from the scattered pilots of four continuous symbol signals are directly extracted and integrated into a frequency response with an interval of three.

The second type is called linear interpolation. In such a method, a linear interpolation is performed on the frequency responses calculated from the scattered pilots of seven continuous symbol signals, so as to obtain a frequency response with an interval of three.

Figure 4B:
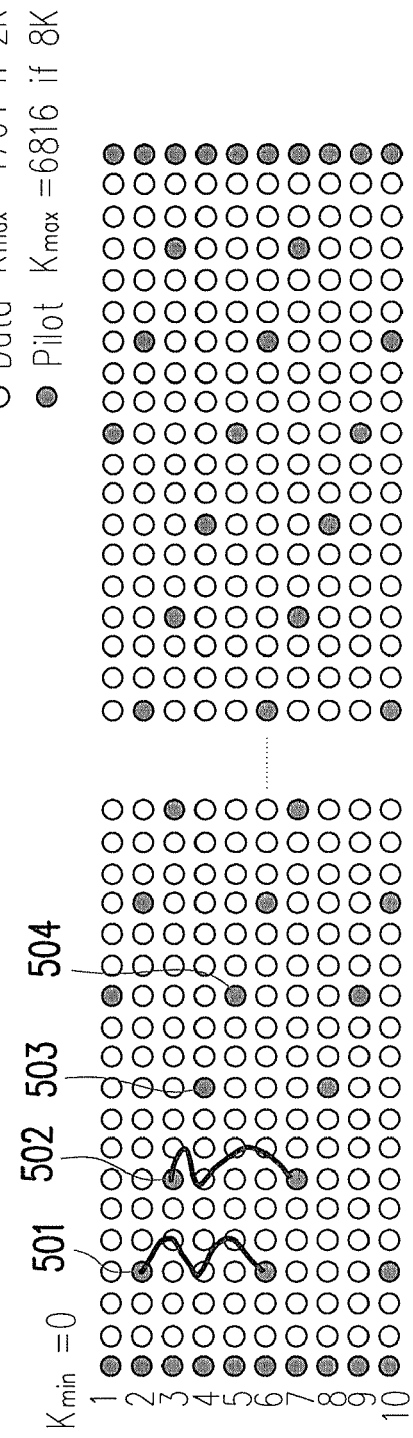
FIG. 4B is a schematic view of a method for performing a linear interpolation on a plurality of scattered pilots of the symbol signals in the DVB-T system.

FIG. 4B is a schematic view of a method for performing a linear interpolation on the plurality of scattered pilots of the symbol signals in the DVB-T system. In FIG. 4B, a longitudinal direction represents the l-th symbol signal, and a horizontal direction represents the k-th sub-carrier in each symbol signal. In order to obtain the frequency response of the fourth symbol with a scattered pilot interval of three in FIG. 4B, interpolation results $H_{4,3+3p}$ and $H_{4,6+3p}$ must be obtained (p is an integer greater than 0). The interpolation results $H_{4,3+3p}$ and $H_{4,6+3p}$ are respectively calculated by the following formulae:

$$H_{4,3+3p}=0.5H_{2,3+3p}+0.5H_{6,3+3p}; H_{4,6+3p}=0.75H_{3,6+3p}+0.25H_{7,6+3p}.$$

The third type of interpolation method is filter interpolation. In this method, the frequency responses calculated from the scattered pilots of the plurality of continuous symbol signals (usually the number of the symbol signals is greater than 7) are input into a finite impulse response (FIR) filter for being filtered, so as to obtain a frequency response with an interval of three.

In the above-mentioned three interpolation methods, the allowable range of the maximum time delay may be expanded to Tu/3. The order of the implementing complexities of the three interpolation methods is "direct interpolation<linear interpolation<filter interpolation", and the order of the performances against the time varying channel is "direct interpolation<linear interpolation<filter interpolation". In order to reduce the complexity, the fine symbol timing synchronization method provided in the embodiment of the present invention adopts linear interpolation. Although the fine symbol timing synchronization method in the embodiment of the present invention adopts linear interpolation, the present invention is not limited thereto. In other words, those of ordinary skill in the art may change linear interpolation to direct interpolation or filter interpolation according to the embodiments of the present invention.

Next, referring to FIGS. 5A to 5D, FIG. 5A is a schematic view of the channel impulse response when the energy of the symbol signal of the first path is greater than that of the symbol signal of the second path, FIG. 5B is a schematic view of the frequency response of the channel impulse response in FIG. 5A, FIG. 5C is a schematic view of the channel impulse response when the energy of the symbol signal of the second path is greater than that of the symbol signal of the first path, and FIG. 5D is a schematic view of the frequency response of the channel impulse response in FIG. 5C. In FIGS. 5A to 5D, when the starting position and energy of the symbol signal of the first path varies, the corresponding channel frequency response is completely different, such that the starting position of the symbol signal of the first path is determined by calculating an MSE between the actually received data and the estimated received data after the equalization and hard decision.

When the i-th path serves as the first path, the obtained MSE between the actually received and the estimated received data may be represented as:

$$MSE_i = \sum_{m=0}^{K_{max}} \left(Y_{i,m} - \hat{H}_{i,m} \cdot X_{i,m}\right)^2,$$

where the sub-channel frequency response $\hat{H}_{i,m}$ represents the sub-channel frequency response estimated from the m-th sub-carrier in the i-th symbol signal, $Y_{i,m}$ represents data of the m-th sub-channel in the i-th symbol signal after the FFT, and $X_{i,m}$ represents data of the m-th sub-channel in the i-th symbol signal after the equalization and hard decision on the frequency domain. Next, the path with the MMSE is found among the plurality of paths to serve as the first path.

In brief, finding the first path becomes finding the path with the MMSE. Although the aforementioned method for calculating the MSE is the most accurate, the squaring calculation is rather complicated, such that the above formula may be reduced by using an absolute value as follows:

$$MSE_i = \sum_{m=0}^{K_{max}} \left|Y_{i,m} - \hat{H}_{i,m} \cdot X_{i,m}\right|.$$

It is assumed that the sub-channel frequency response of the channel frequency response obtained after linear interpolation and frequency domain filtering is $\hat{H}_{0,m}$, the correspondingly received data on the frequency domain is $Y_{0,m}$, and the data obtained after the equalization and hard decision is $X_{0,m}$. On the time domain, adopting the i-th path as the first path is equivalent to moving the i-th path in the channel impulse response to the initial point, i.e., moving by a distance of $\theta_i$. In addition, according to the time shifting property of FFT, the data $Y_{i,m}$ on the frequency domain obtained when the i-th path serves as the first path may be represented as follows:

$$Y_{i,m} = Y_{0,m} \cdot e^{\frac{j2\pi\theta_i m}{N}},$$

where, N is the length of the FFT window. In order to further reduce the calculation of the MSE, the norms of the data $X_{i,m}$, $Y_{i,m}$, and the sub-channel frequency response $\hat{H}_{i,m}$ are merely calculated, and the phases of the data $X_{i,m}$, $Y_{i,m}$, and the sub-channel frequency response $\hat{H}_{i,m}$ are omitted. Thus, the formula of calculating the MSE is further reduced to:

$$MSE_i = \sum_{m=0}^{K_{max}} \left\| |Y_{0,m}| - |\hat{H}_{i,m}| \cdot |X_{i,m}| \right\|.$$

In addition, the data $X_{i,m}$ transmitted on the frequency domain is a numerical value around 1, such that the effect of the equalization and hard decision may be omitted, and the formula of calculating the MSE is reduced to:

$$MSE_i = \sum_{m=0}^{K_{max}} \left\| |Y_{0,m}| - |\hat{H}_{i,m}| \right\|.$$

Finally, for the receiver, the data $Y_{0,m}$ is data on the received frequency domain. Therefore, as long as the numerical value of the sub-channel frequency response $\hat{H}_{i,m}$ is calculated, the MSE when each path is set as the first path is obtained.

Next, the calculation of the numerical value of the sub-channel frequency response $\hat{H}_{i,m}$ is described below. The values of the sub-channel frequency response $\hat{H}_{0,w}^{s3}$ (w=0, 3, 6, ..., $K_{max}$) with an interval of three is obtained according to the above symbol signals through linear interpolation or other interpolation methods. According to the time-translation characteristics of the FFT, the sub-channel frequency response $\hat{H}i,w^{s3}$ of the symbol signal with a scattered interval of three when the i-th path is moved to the initial point is obtained, and the sub-channel frequency response $\hat{H}_{i,w}^{s3}$ represented as follows:

$$\hat{H}_{i,w}^{s3} = \hat{H}_{0,w}^{s3} \cdot e^{\frac{j2\pi\theta_i w}{N}}, w = 0, 3, 6, \ldots, K_{max}.$$

Afterward, the channel frequency response $\hat{H}_i^{s3}$ ($\hat{H}_i^{s3}$ has every sub-channel frequency response $\hat{H}_{i,w}^{s3}$) obtains all the sub-channel frequency responses $\hat{H}_{i,m}$ through a low-pass filter. As the receiver may not know the multi-path time delay of the channel, the low-pass filter sets a cut-off bandwidth according to the time delay of the maximum channel supported by the system.

Further, when the channel frequency response $\hat{H}_i^{s3}$ is calculated, due to the phase rotation periodicity, results of $$e^{\frac{j2\pi\theta_i w}{N}} \text{ and } e^{\frac{j2\pi(N-\theta_i)w}{N}}$$

are the same. Thus, the channel frequency responses calculated by moving the path leftward or rightward to the initial point are equal. Before calculating the channel frequency response $\hat{H}_i^{s3}$, the moving direction of the path must be designated in advance, and in the channel impulse response, the correct first path is usually the first path on the left or the mirrored path on the right. Therefore, it is specified that the first path found from the left in the channel impulse response moves leftward and the remaining paths move rightward.

In addition, the MSE may not be calculated by using the data of all the sub-carriers. The sub-channel frequency response $\hat{H}_{i,m}$ is obtained from the sub-channel frequency response $\hat{H}_{i,w}^{s3}$, of the symbol signal with a scattered interval of three through the low-pass filter, so the norm of the sub-channel frequency response $\hat{H}_{i,w}^{s3}$ is equal to that of the sub-channel frequency response $\hat{H}_{0,w}^{s3}$. Thus, the value of the sub-channel frequency response $\hat{H}_{i,m}$ at m=0, 3, 6 . . . is sustained, and it is unnecessary to calculate the MSE therebetween. Without considering the above sub-carriers, when the MSE is calculated, it is possible to merely select sub-carriers with a relatively larger SNR to calculate the MSE, i.e., the MSE is calculated only when the data $Y_{0,m}$ exceeds the threshold.

Seen from the above, the fine symbol timing synchronization method provided in the embodiment of the present invention selects the path with the MMSE as the first path to adjust the starting position of the FFT window. The formula of calculating the MSE may select the aforementioned reduced or non-reduced formula of the MSE.

Figure 6A:
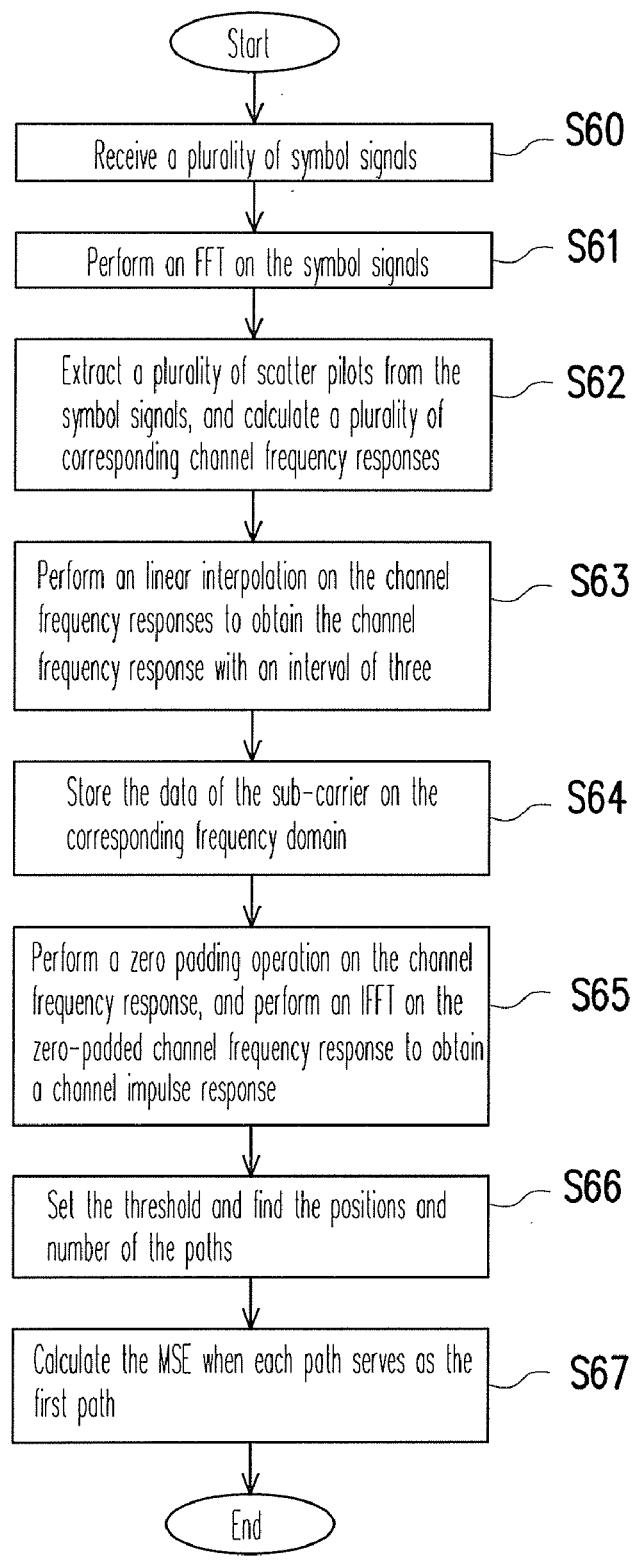
FIG. 6A is a flow chart of a fine symbol timing synchronization method according to an embodiment of the present invention.

FIG. 6A is a flow chart of a fine symbol timing synchronization method according to an embodiment of the present invention. First, in Step S60, a plurality of symbol signals is received. Then, in Step S61, an FFT is sequentially performed on the received symbol signals. In Step S62, a plurality of scattered pilots are extracted from the symbol signals after the FFT to calculate a plurality of channel frequency responses. The method for calculating the channel frequency responses is described above, and the details will not be given herein again.

Thereafter, in Step S63, the channel frequency response $\hat{H}_0^{s3}$ of the symbol signal with an interval of three is calculated according to the channel frequency responses through linear interpolation. In Step S63, the implementation and calculation of the linear interpolation are described above (referring to relevant description in FIG. 4B). Further, in Step S63, the linear interpolation may be changed to the filter interpolation or direct interpolation. Next, in Step S64, the data $Y_{0,m}$ of the sub-carrier on the corresponding frequency domain is stored, and varies corresponding to different interpolation methods. In direct interpolation, $Y_{0,m}$ is equal to any symbol signal used for interpolation. In linear interpolation, $Y_{0,m}$ is equal to a fourth symbol signal used for interpolation. In filter interpolation, if an order of the filter is L (must be an even), $Y_{0,m}$ is equal to an ((L+2)/2)-th symbol signal used for interpolation. Next, in Step S65, a zero padding operation is performed on the channel frequency response $\hat{H}_0^{s3}$, and an IFFT is performed on the zero-padded channel frequency response to obtain a channel impulse response $\hat{h}_l$ (the channel impulse response $\hat{h}_l$ has response values $\hat{h}_{l,n}$ of a plurality of points). In Step S66, the threshold TH is set, and the positions and number of the paths are found. The method for setting the threshold TH is described above, and the details will not be given herein again. In addition, the point with the response value $\hat{h}_{l,n}$ exceeding the threshold TH is considered as a path, and the point with the response value $\hat{h}_{l,n}$ not exceeding the threshold TH is considered as just a noise.

Finally, in Step S67, the MSE, when each path serves as the first path, is calculated, and the path with the MMSE is found as the first path. The formula and method for calculating the MSE are described above, so the details will not be given herein again. However, in order to easily understand the fine symbol timing synchronization method provided in the embodiment of the present invention, FIG. 6B shows a sub-flow of Step S67, but the implementation manner of FIG. 6B is not intended to limit the present invention.

Figure 6B:
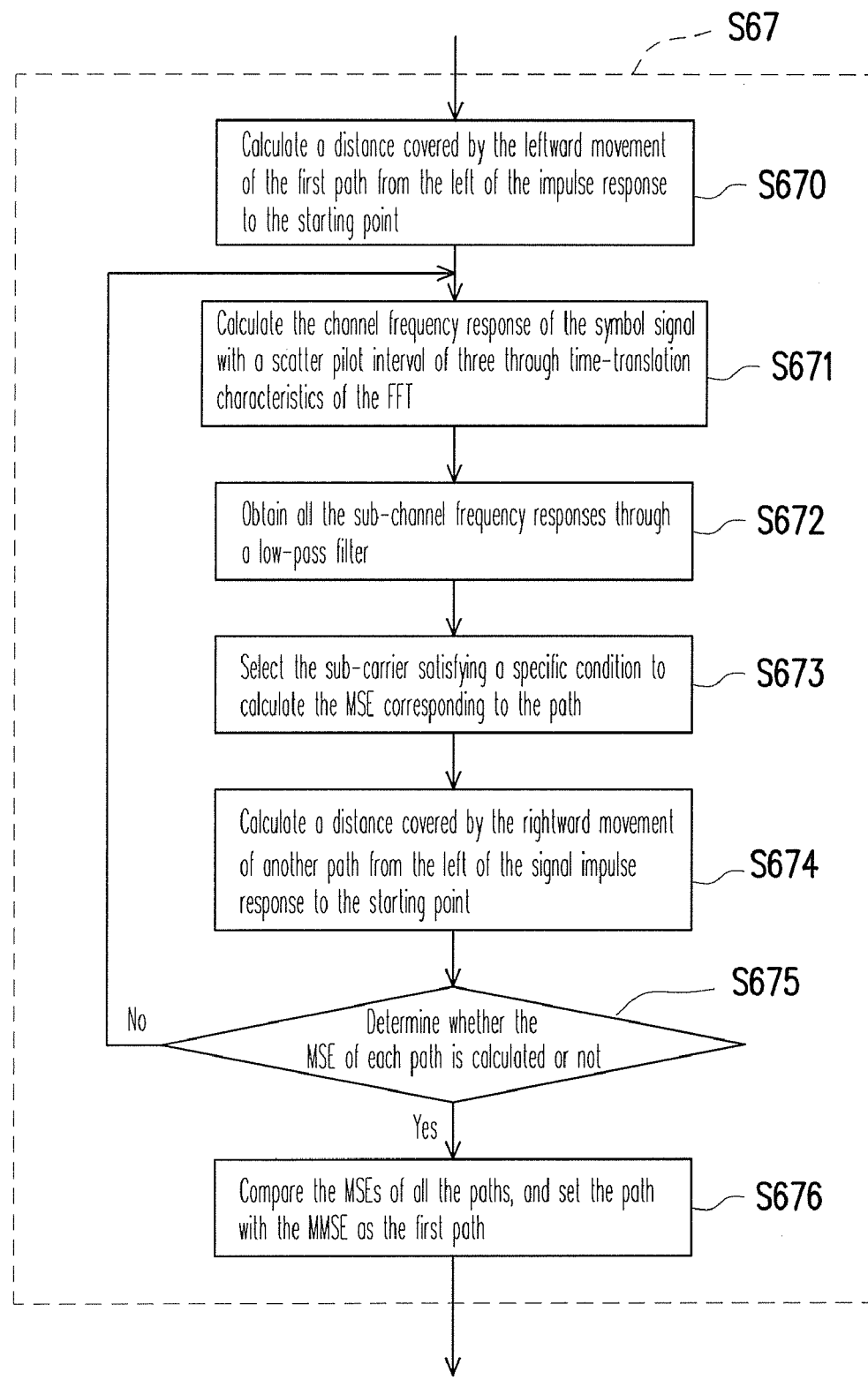
FIG. 6B is a flow chart of Step S67 in FIG. 6A.

FIG. 6B is a flow chart of Step S67 in FIG. 6A. In Step S670, a distance $\theta_1$ covered by the leftward movement of the first path of the impulse response to the initial point is calculated, wherein the first path of the impulse response is in reference to the left. In Step S671, the channel frequency response $\hat{H}_i^{s3}$ of the symbol signal with a scattered pilot interval of three is calculated through time-translation characteristics of the FFT, and the formula of calculating the sub-channel frequency response $\hat{H}_{i,w}^{s3}$ of the channel frequency response $\hat{H}_i^{s3}$ is as follows:

$$\hat{H}_{i,w}^{s3} = \hat{H}_{0,w}^{s3} \cdot e^{\frac{j2\pi\theta_i w}{N}}.$$

It should be noted that in Step S671, firstly the channel frequency response $\hat{H}_{i,w}^{s3}$ is calculated according to $\theta_l$. However, after Step S674 is performed, the sub-channel frequency response $\hat{H}_{i,k}^{s3}$ is calculated according to the rightward displacement $\theta_i$ of the i-th (i is an integer greater than 2) path in the channel impulse response to the initial point.

In Step S672, the channel frequency response $\hat{H}_i^{s3}$ is transmitted to a low-pass filter for being filtered, so as to obtain all the sub-channel frequency responses $\hat{H}_{i,m}$ of the channel frequency response $\hat{H}_i$. The low-pass filter may set the cut-off bandwidth of the low-pass filter according to the time delay of the maximum channel supported by the system, and the cut-off bandwidth of the low-pass filter may be set according to different circumstances. In brief, the cut-off bandwidth of the low-pass filter is not intended to limit the present invention.

In Step S673, the sub-carrier satisfying a specific condition is selected to calculate the MSE corresponding to the path, for example, data of the sub-carrier greater than the threshold and data of the sub-carrier with an index value not being a multiple of 3. In this embodiment, the formula of calculating the MSE is as follows:

$MSE_i = \Sigma |Y_{0,m}| - |\hat{H}_{i,m}|, m$ satisfies the preset condition, where, m≠0, 36 . . . $K_{max}$, and for each m, $|Y_{0,m}|$ must be greater than the threshold TH. The above condition and formula of calculating the MSE are only an implementation manner of the present invention. Without considering the complexity, the operation is performed on each sub-carrier, and the formula of the MSE may select a non-reduced one. In brief, the condition and formula of calculating the MSE are not intended to limit the present invention.

In Step S674, a distance $\theta_i$ (i is an integer greater than 1) of another path of the signal impulse response moving rightward to the initial point is calculated, that is, a distance $\theta_i$ covered by the rightward movement of the second or above path of the signal impulse response to the initial point is calculated, wherein second or above path of the signal impulse response is in reference to the left. Then, in Step S675, it is determined whether the MSE of each path is calculated or not, and if not, return to Step S671; otherwise, proceed to Step S676. Finally, in Step S676, the MSEs of all the paths are compared, and the path with the MMSE is set as the first path. After the first path is found, the starting position of the FFT window is set on the starting position of the symbol signal of the first path, and the whole fine symbol timing synchronization method is finished.

Figure 7A:
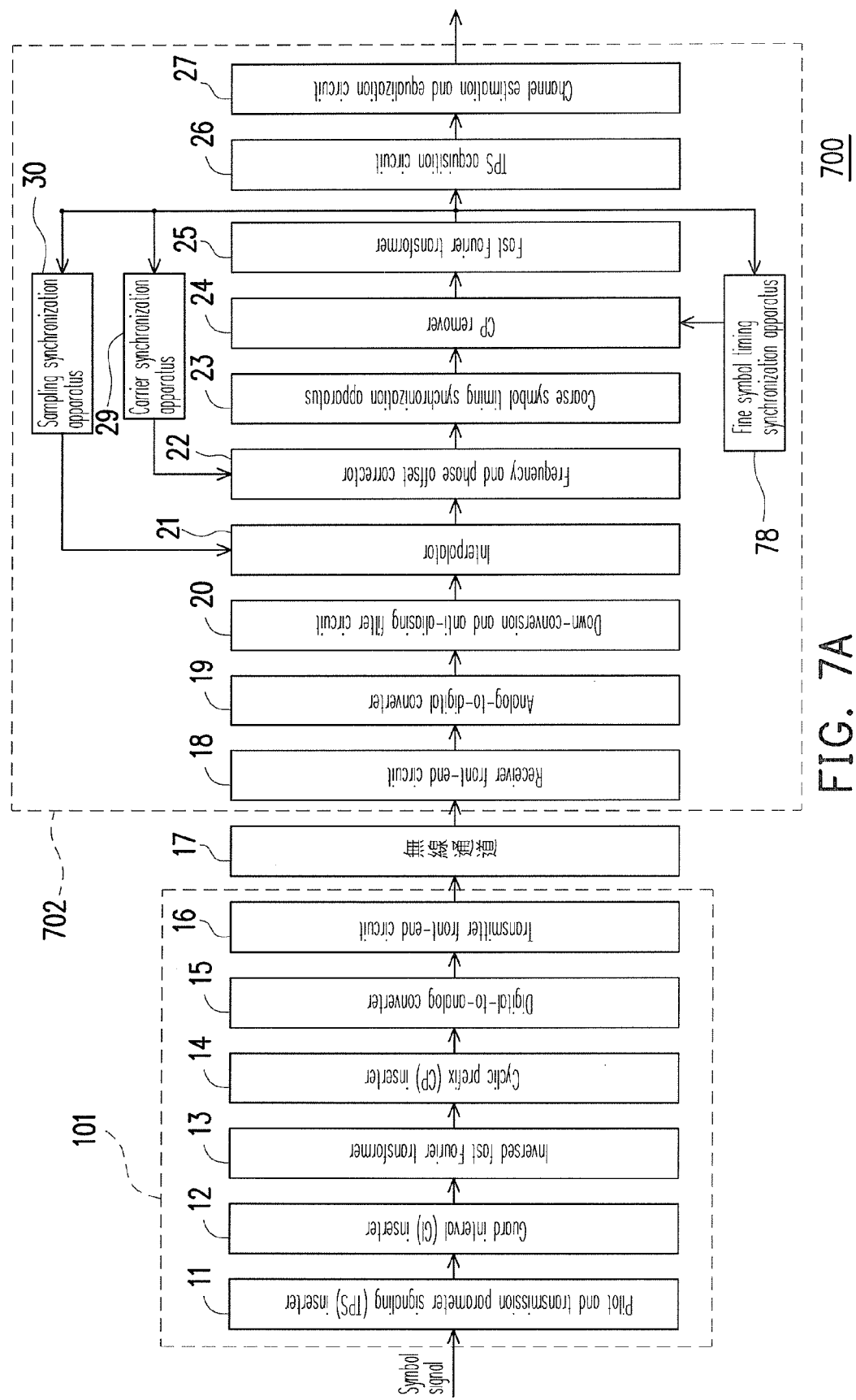
FIG. 7A is a systematic block diagram of a DVB-T system 700 employing a communication transceiver according to an embodiment of the present invention.

FIG. 7A is a systematic block diagram of a DVB-T system 700 employing a communication transceiver according to an embodiment of the present invention. The communication transceiver includes a transmitter 101 and a receiver 702. The transmitter 101 in FIG. 7A is completely the same as the transmitter 101 in FIG. 1, and the receiver 702 in FIG. 7A is identical to the receiver 102 in FIG. 1 except that the fine symbol timing synchronization apparatus 78 is different from the fine symbol timing synchronization apparatus 28. Thus, only the fine symbol timing synchronization apparatus 78 is described hereinafter, and other parts will be omitted.

Figure 7B:
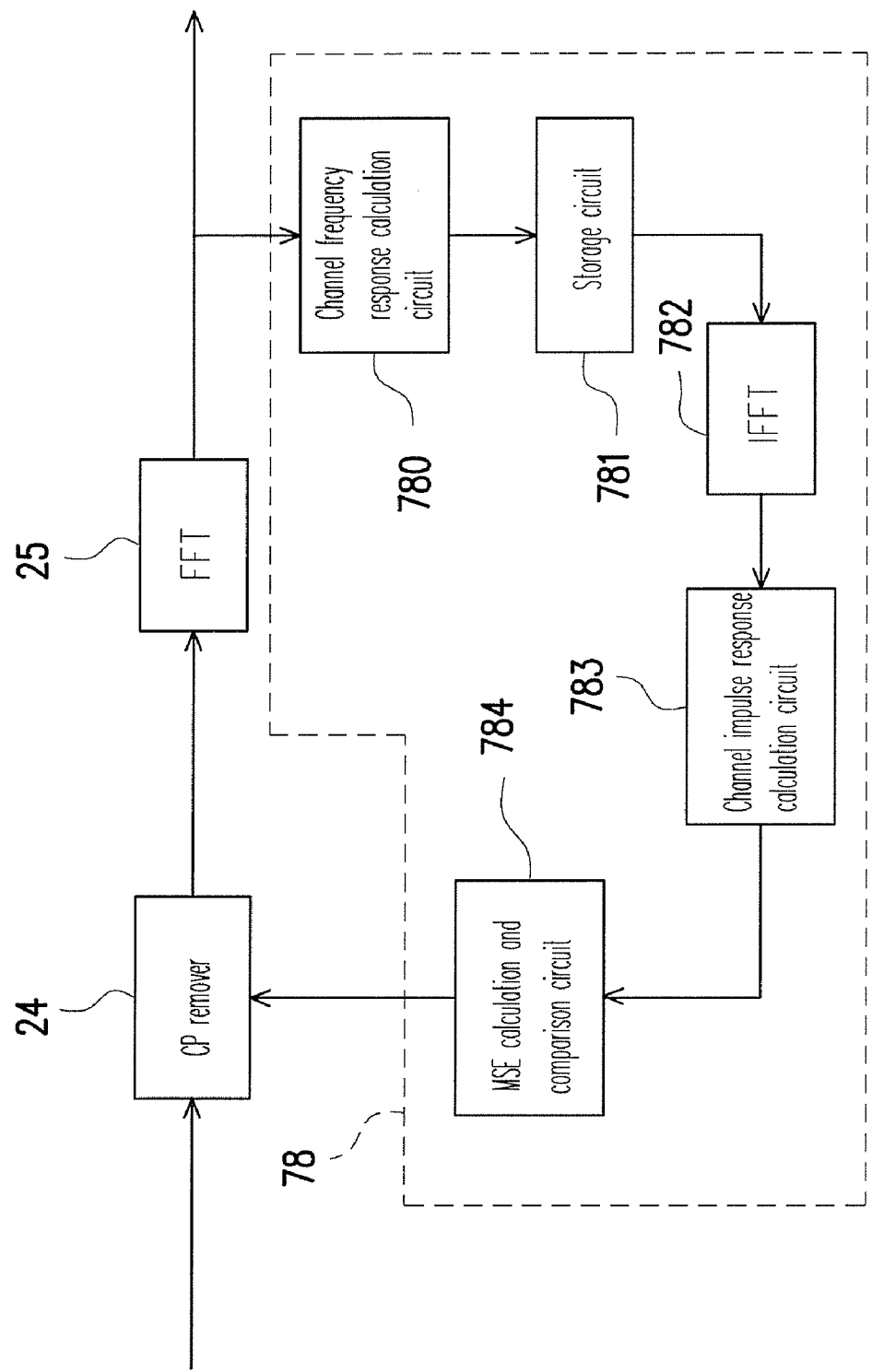
FIG. 7B is a systematic block diagram of a fine symbol timing synchronization apparatus 78.

FIG. 7B is a systematic block diagram of the fine symbol timing synchronization apparatus 78. The fine symbol timing synchronization apparatus 78 includes a channel frequency response calculation circuit 780, a storage circuit 781, an inversed fast Fourier transformer 782, a channel impulse response calculation circuit 783, and an MSE calculation and comparison circuit 784. The channel frequency response circuit 780 is coupled to the fast Fourier transformer 25, the storage circuit 781 is coupled to the channel frequency response circuit 780, the inversed fast Fourier transformer 782 is coupled to the storage circuit 781, the channel impulse response calculation circuit 783 is coupled to the inversed fast Fourier transformer 782, and the MSE calculation and comparison circuit 784 is coupled to the channel impulse response calculation circuit 783 and the CP remover 24.

The channel frequency response calculation circuit 780 first extracts a plurality of scattered pilots from the symbol signals after the FFT, and calculates a plurality of corresponding channel frequency responses. Then, the channel frequency response calculation circuit 780 performs a linear interpolation on the calculated channel frequency responses, so as to generate a channel frequency response $\hat{H}_0^{s3}$ of the symbol signal with a scattered pilot interval of three. The storage circuit 781 stores the data $Y_{0,m}$ of the sub-carrier on the frequency domain. The inversed fast Fourier transformer 782 performs a zero padding operation on the channel frequency response $\hat{H}_0^{s3}$, and perform an IFFT on the zero-padded channel frequency response to obtain a channel impulse response $\hat{h}_l$.

Next, the channel impulse response calculation circuit 783 sets the threshold TH and finds the positions and number of the paths. The point with the response value $\hat{h}_{l,n}$ exceeding the threshold TH is considered as a path, and the point with the response value $\hat{h}_{l,n}$ not exceeding the threshold TH is considered just as a noise. After that, the MSE calculation and comparison circuit 784 calculates the MSE when each path serves as the first path, and finds the path with the MMSE as the first path. The implementation manner that the MSE calculation and comparison circuit 784 finds the correct first path may refer to Steps S670 to S676 in FIG. 6B, and the implementation manner of the MSE calculation and comparison circuit 784 is not intended to limit the present invention.

Figure 8:
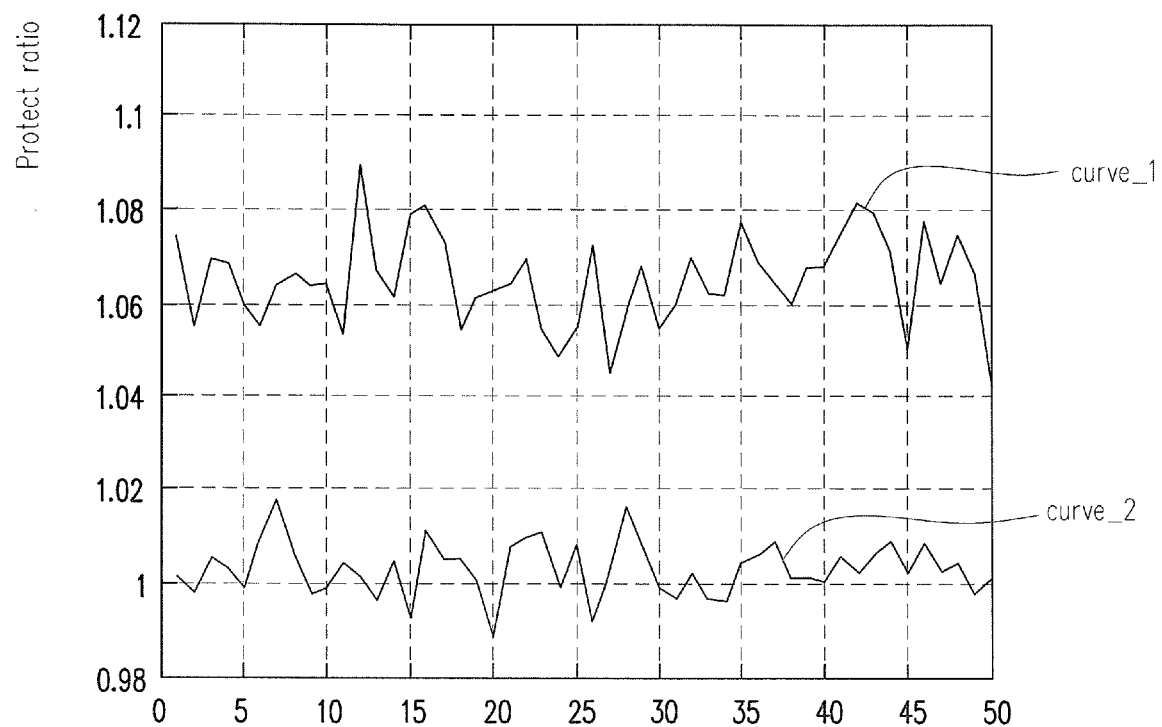
FIG. 8 is a curve diagram illustrating performance comparison between the fine symbol timing synchronization method provided in the embodiment of the present invention and the conventional fine symbol timing synchronization method.

FIG. 8 is a curve diagram illustrating performance comparison between the fine symbol timing synchronization method provided in the embodiment of the present invention and the conventional fine symbol timing synchronization method. In FIG. 8, the result is obtained by 50 times of simulation on a channel with a relatively low SNR value, curve_1 is a performance curve of the fine symbol timing synchronization method provided in the embodiment of the present invention, and curve_2 is a performance curve of the conventional fine symbol timing synchronization method employing a noise power method. The number x on the lateral axis represents the x-th time of simulation, and the number on the longitudinal axis represents a protect ratio. The protect ratio represents a ratio of the MSE or the noise power of the correct first path and the false first path, if the protect ratio is greater than 1, a false determination will not occur, and if the protect ratio is smaller than 1, a false determination will occur.

Seen from FIG. 8, the performance of the fine symbol timing synchronization method provided in the embodiment of the present invention is better than that of the conventional fine symbol timing synchronization method. Further, the fine symbol timing synchronization method of the present invention does not need a complicated feedback circuit, and thus the first path can be quickly found instead of requiring tens of milliseconds as in the conventional method. To be specific, the synchronization time of the fine symbol timing synchronization method of the present invention can be controlled within ten milliseconds.

In view of the above, the fine symbol timing synchronization method of the present invention finds the path with the MMSE as the first path among a plurality of paths, and the formula of the MSE used by the method is reduced to a formula of the MSE with low calculation complexity. Therefore, the time required by the fine symbol timing synchronization method, apparatus, and communication transceiver thereof is short, and a correct first path can be found, so as to lock the starting position of the FFT window on the starting position of the symbol signal of the correct first path.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fine symbol timing synchronization method in an orthogonal frequency-division multiplexing (OFDM) system, comprising:
    receiving a plurality of first time domain symbol signals;
    performing a fast Fourier transform (FFT) on the first time domain symbol signals to generate a plurality of first frequency domain symbol signals;
    extracting a plurality of scattered pilots from the first frequency domain symbol signals, and calculating a plurality of first channel frequency responses according to the scattered pilots;
    performing an interpolation on the first channel frequency responses to generate a second channel frequency response;
    storing one of the first frequency domain symbol signals, wherein the stored first frequency domain symbol signal is corresponding to the second channel frequency response;
    performing a zero padding operation on the second channel frequency response, and performing an inversed fast Fourier transform (IFFT) on a zero padding result to obtain a first channel impulse response;
    setting a threshold, and finding a plurality of paths in the first channel impulse response according to the first channel impulse response and the threshold; and
    calculating a mean square error (MSE) between frequency domain data in the first frequency domain symbol signals and a third channel frequency response when each path in the first channel impulse response serves as a first path, and setting the path with a minimum mean square error (MMSE) as the first path.

2. The fine symbol timing synchronization method in an OFDM system according to claim 1, wherein when the fine symbol timing synchronization method is applied to a digital video broadcasting system, a scattered pilot interval of the second channel frequency response is 3.

3. The fine symbol timing synchronization method in an OFDM system according to claim 1, wherein positions of the paths are positions of the first channel impulse response whose response values are greater than the threshold.

4. The fine symbol timing synchronization method in an OFDM system according to claim 1, wherein the step of calculating the mean square error is used a formula $MSE_i$ as following when an i-th path in the first channel impulse response serves as the first path:

$$MSE_i = \sum_{m=0}^{K_{max}} \left\| |Y_{0,m}| - |\hat{H}_{i,m}| \right\|$$

wherein $Y_{0,m}$ represents data of an m-th sub-channel in the first frequency domain symbol signal corresponding to the second channel frequency response, when the i-th path serves as the first path, a response value of a m-th sub-channel in the third channel frequency response is denoted as $\hat{H}_{i,m}$, and $K_{max}$ is the number of a maximum sub-channel.

5. The fine symbol timing synchronization method in an OFDM system according to claim 1, wherein the step of calculating the MSE when each path in the first channel impulse response serves as the first path, and setting the path with the MMSE as the first path further comprises:
    calculating a distance between an i-th path of the first channel impulse response and an initial point, the i-th path of the first channel impulse response being in reference to the left, wherein when i=1, the distance between the i-th path of the first channel impulse response and the initial point is a leftward displacement of the i-th path of the first channel impulse response to the initial point, and when i≠1, the distance between the i-th path of the first channel impulse response and the initial point is a rightward displacement of the i-th path of the first channel impulse response to the initial point;
    calculating the third channel frequency response according to the distance between the i-th path of the first channel impulse response and an initial point, and the second channel frequency response;
    selecting a sub-carrier satisfying a specific condition from the stored first frequency domain symbol signal to calculate the MSE with the third channel frequency response;
    checking whether the calculation of MSE is done when each path serves as the first path; and
    comparing the MSE of each path, and setting the path with the MMSE as the first path.

6. The fine symbol timing synchronization method in an OFDM system according to claim 5, wherein the step of calculating the $MSE_i$ is used a formula as following while the i-th path in the first channel impulse response serves as the first path:

$$MSE_i = \Sigma \left\| |Y_{0,m}| - |\hat{H}_{i,m}| \right\|,$$

wherein $Y_{0,m}$ represents data of an m-th sub-channel in the first frequency domain symbol signal corresponding to the second channel frequency response, $\hat{H}_{i,m}$ represents a response value of a m-th sub-channel in the third channel frequency response while the i-th path serves as the first path, and m is an index value of the sub-carrier satisfying the specific condition.

7. The fine symbol timing synchronization method in an OFDM system according to claim 5, wherein the specific condition comprises an amplitude of the sub-carrier of the stored first frequency domain symbol signal is greater than the threshold.

8. The fine symbol timing synchronization method in an OFDM system according to claim 7, wherein when the fine symbol timing synchronization method is applied to a digital video broadcasting system, the specific condition further comprises the index value of the sub-carrier of the stored first frequency domain symbol signal is neither 0 nor a multiple of 3.

9. The fine symbol timing synchronization method in an OFDM system according to claim 1, wherein the interpolation is a linear interpolation.

10. The fine symbol timing synchronization method in an OFDM system according to claim 1, wherein the threshold is a product obtained from multiplying an average value of the response values in the first channel impulse response by a scale factor.

11. A fine symbol timing synchronization apparatus in an orthogonal frequency division multiplexing (OFDM) system, comprising:
  a channel frequency response calculation circuit, with an input end coupled to an input end of the fine symbol timing synchronization apparatus, for receiving a plurality of first frequency domain symbol signals, extracting a plurality of scattered pilots from the first frequency domain symbol signals, calculating a plurality of first channel frequency responses according to the scattered pilots, and performing an interpolation on the first channel frequency responses to generate a second channel frequency response;
  a storage circuit, with an input end coupled to an output end of the fine symbol timing synchronization apparatus, for storing one of the first frequency domain symbol signals, wherein the stored first frequency domain symbol signal is corresponding to the second channel frequency response;
  an inversed fast Fourier transformer, with an input end coupled to an output end of the storage circuit, for performing a zero padding operation on the second channel frequency response, and performing an inversed fast Fourier transform (IFFT) after the zero padding operation to obtain a first channel impulse response;
  a channel impulse response calculation circuit, with an input end coupled to an output end of the inversed fast Fourier transformer, having a threshold to find a plurality of paths in the first channel impulse response according to the first channel impulse response and the threshold; and
  a mean square error (MSE) calculation and comparison circuit, with an input end coupled to the channel impulse response calculation circuit and an output end coupled to an output end of the fine symbol timing synchronization apparatus, for calculating an MSE of each path between frequency domain data in the first frequency domain symbol signals and a third channel frequency response when each path in the first channel impulse response serves as a first path, and setting the path with a minimum mean square error (MMSE) as the first path.

12. The fine symbol timing synchronization apparatus in an OFDM system according to claim 11, wherein when the fine symbol timing synchronization method is applied to a digital video broadcasting system, a scattered pilot interval of the second channel frequency response is 3.

13. The fine symbol timing synchronization apparatus in an OFDM system according to claim 11, wherein positions of the paths are positions of the first channel impulse response whose response values are greater than the threshold.

14. The fine symbol timing synchronization apparatus in an OFDM system according to claim 11, wherein a formula of calculating the $MSE_i$ when an i-th path in the first channel impulse response serves as the first path is as follows:

$$MSE_i = \sum_{m=0}^{K_{max}} \left\| |Y_{0,m}| - |\hat{H}_{i,m}| \right\|$$

wherein $Y_{0,m}$ represents data of an m-th sub-channel in the first frequency domain symbol signal corresponding to the second channel frequency response, when the i-th path serves as the first path, a response value of a m-th sub-channel in the third channel frequency response is denoted as $\hat{H}_{i,m}$, and $K_{max}$ is a maximum number of the sub-channels.

15. The fine symbol timing synchronization apparatus in an OFDM system according to claim 11, wherein the step of calculating the MSE of each path when each path in the first channel impulse response serves as the first path, and setting the path with the MMSE as the first path further comprises:
  calculating a distance between an i-th path of the first channel impulse response and an initial point, the i-th path of the first channel impulse response being in reference to the left, wherein when i=1, the distance between the i-th path of the first channel impulse response and the initial point is a leftward displacement of the i-th path of the first channel impulse response to the initial point, and when i≠1, the distance between the i-th path of the first channel impulse response and the initial point is a rightward displacement of the i-th path of the first channel impulse response to the initial point;
  calculating the third channel frequency response according to the distance between the i-th path of the first channel impulse response and an initial point, and the second channel frequency response;
  selecting a sub-carrier satisfying a specific condition from the stored first frequency domain symbol signal to calculate the MSE with the third channel frequency response;
  checking whether the calculation of MSE is finished when each path serves as the first path; and
  comparing the MSE of each path, and setting the path with the MMSE as the first path.

16. The fine symbol timing synchronization apparatus in an OFDM system according to claim 15, wherein a formula of calculating the MSE, when the i-th path in the first channel impulse response serves as the first path is as follows:

$$MSE_i = \Sigma \left\| |Y_{0,m}| - |\hat{H}_{i,m}| \right\|,$$

wherein $Y_{0,m}$ represents data of an m-th sub-channel in the first frequency domain symbol signal corresponding to the second channel frequency response, $\hat{H}_{i,m}$ represents a response value of a m-th sub-channel in the third channel frequency response while the i-th path serves as the first path, and m is an index value of the sub-carrier satisfying the specific condition.

17. The fine symbol timing synchronization apparatus in an OFDM system according to claim 15, wherein the specific condition comprises an amplitude of the sub-carrier of the stored first frequency domain symbol signal is greater than the threshold.

18. The fine symbol timing synchronization apparatus in an OFDM system according to claim 17, wherein when the fine symbol timing synchronization method is applied to a digital video broadcasting system, the specific condition further comprises the index value of the sub-carrier of the stored first frequency domain symbol signal is neither 0 nor a multiple of 3.

19. The fine symbol timing synchronization apparatus in an OFDM system according to claim 11, wherein the interpolation is a linear interpolation.

20. The fine symbol timing synchronization apparatus in an OFDM system according to claim 11, wherein the threshold is a product obtained from multiplying an average value of the response values in the first channel impulse response by a scale factor.

* * * * *